(12) United States Patent
Weiler

(10) Patent No.: US 6,551,386 B2
(45) Date of Patent: Apr. 22, 2003

(54) OXYGEN SEPARATION DEVICE

(75) Inventor: Ludwig Weiler, Darmstadt (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/006,708

(22) Filed: Dec. 10, 2001

(65) Prior Publication Data

US 2002/0129708 A1 Sep. 19, 2002

(30) Foreign Application Priority Data

Dec. 23, 2000 (DE) .......................................... 100 64 894

(51) Int. Cl.⁷ ............................................... B01D 53/22
(52) U.S. Cl. ...................................... 96/4; 95/54; 96/7
(58) Field of Search .............................. 95/54; 96/4, 7, 96/8, 10; 210/321.6, 321.72, 321.75, 321.84

(56) References Cited

U.S. PATENT DOCUMENTS

| | | | |
|---|---|---|---|
| 2,618,357 A | * 11/1952 | Harlow ............................... | 96/7 |
| 3,550,355 A | * 12/1970 | Remus et al. ................... | 95/54 |
| 3,847,672 A | * 11/1974 | Trocciola et al. ............. | 96/4 X |
| 3,930,814 A | * 1/1976 | Gessner ...................... | 95/54 X |
| 3,976,451 A | * 8/1976 | Blackmer et al. ................. | 96/7 |
| 3,979,190 A | * 9/1976 | Hedman ........................... | 96/7 |
| 5,820,654 A | * 10/1998 | Gottzman et al. .............. | 95/54 |
| 5,820,655 A | * 10/1998 | Gottzmann et al. ............ | 95/54 |
| 6,117,210 A | * 9/2000 | Prasad et al. ................. | 96/4 X |
| 6,224,766 B1 | * 5/2001 | Yamato et al. ......... | 210/321.75 |
| 6,309,612 B1 | * 10/2001 | Balachandran et al. ..... | 95/54 X |
| 6,394,043 B1 | * 5/2002 | Bool, III et al. ............ | 95/54 X |

FOREIGN PATENT DOCUMENTS

| | | | | |
|---|---|---|---|---|
| CA | 0655632 A | * | 1/1963 | ....................... 96/8 |
| DE | 25 24 242 C2 | | 1/1976 | |
| DE | 42 21 593 A1 | | 1/1993 | |
| JP | 02-217305 A | * | 8/1990 | ....................... 96/4 |
| SU | 1662603 A | * | 7/1991 | ....................... 96/4 |

* cited by examiner

Primary Examiner—Robert H. Spitzer
(74) Attorney, Agent, or Firm—Burns, Doane, Swecker & Mathis, L.L.P.

(57) ABSTRACT

The invention relates to an oxygen separation device comprising a housing, in which a membrane body separates a first chamber from a second chamber. The membrane body comprises several first channels and several second channels. The channels are arranged in the housing in such a way that their ends on one side of the membrane body are exposed to the first chamber, while their ends on the other side of the membrane body are exposed to the second chamber. In all first channels, the ends exposed to the first chamber are open, and the ends exposed to the second chamber are closed. In all second channels, the ends exposed to the first chamber are closed, and the ends exposed to the second chamber are open. The walls of the channels are formed by an oxygen transport membrane of the membrane body. The oxygen transport membrane is positioned so that the insides of the first channels are formed by the retention side of the oxygen transport membrane, and the insides of the second channels are formed by the permeation side of the oxygen transport membrane. The membrane body is held in a gas-tight manner on its outside between the ends of the channels.

12 Claims, 1 Drawing Sheet

OXYGEN SEPARATION DEVICE

FIELD OF THE INVENTION

The invention relates to an oxygen separation device employing an oxygen transport membrane for removing oxygen from a first supplied oxygen-containing gas and feeding it to a second supplied gas to be enriched with oxygen. Such oxygen separation devices can be used, particularly in power plants, for providing the oxygen required for combustion, and to thereby reduce emissions, especially $CO_2$ emissions during the combustion of fossil fuels, by using molecular oxygen, instead of air, for the combustion.

BACKGROUND OF THE INVENTION

An oxygen separation device usually comprises a housing in which a membrane body separates a first chamber from a second chamber. The membrane body comprises said oxygen transport membrane that has a retention side and a permeation side and is designed so that it transports oxygen from the retention side to the permeation side. The housing comprises a first inlet that communicates with the first chamber and is used to introduce an oxygen-containing gas, for example ambient air, into the first chamber. The housing furthermore comprises a second inlet that communicates with the second chamber and is used to introduce a gas to be enriched with oxygen, for example recycled combustion waste gas, into the second chamber.

The membrane body is usually arranged inside the housing in such a way that the retention side of the oxygen transport membrane forms a wall section of the first chamber, and the permeation side of the oxygen transport membrane forms a wall section of the second chamber. In this manner, the oxygen transport membrane is able to remove oxygen from the oxygen-containing gas in the first chamber during operation of the oxygen transport membrane, and feed it into the gas to be enriched with oxygen in the second chamber. Accordingly, a gas with reduced oxygen content is produced in the first chamber, while an oxygen-enriched gas is formed in the second chamber.

The housing also is provided with a first outlet that communicates with the first chamber and is used to discharge the oxygen-reduced gas from the first chamber. Analogously, the housing is also provided with a second outlet that communicated with the second chamber and is used to discharge the oxygen-enriched gas from the second chamber.

To ensure proper function of the oxygen separation device, it is important to avoid leaks between the first chamber and the second chamber. The positioning and sealing of the membrane body in the housing is therefore of critical importance. A sealed positioning of the membrane body in the housing is made difficult by the fact that thermal expansions during the operation of the device are inevitable, so that the respectively used bearings and seals must be able to compensate the thermal expansion effects. At the same time, tensions in the material of the membrane body must be prevented because the oxygen transport membrane is usually produced of a ceramic material that can be easily damaged by material tensions.

SUMMARY OF THE INVENTION

The invention means to remedy this. The invention has the objective of disclosing an embodiment of an oxygen separation device in which a sealed positioning of the membrane body in the housing is simplified, and in which the joint zone with the housing, in relation to the membrane surface, is kept very small.

In a first exemplary embodiment, this objective is realized with an oxygen separation device comprising a membrane body and a housing, in which the membrane body separates a first chamber from a second chamber. The housing comprises a first inlet that communicates with the first chamber and is used to introduce an oxygen-containing gas and a second inlet that communicates with the second chamber and is used to introduce a gas to be enriched with oxygen. The membrane body comprises an oxygen transport membrane that has a retention side and a permeation side and is designed so that it transports oxygen from the retention side to the permeation side. The membrane body is arranged inside the housing in such a way that the retention side of the oxygen transport membrane communicates with the first chamber, and the permeation side of the oxygen transport membrane communicates with the second chamber. The oxygen transport membrane removes oxygen from the introduced oxygen-containing gas and feeds this oxygen into the introduced gas to be enriched with oxygen, so that in the first chamber an oxygen-reduced gas and in the second chamber an oxygen-enriched gas are formed. The housing comprises a first outlet that communicates with the first chamber and is used to discharge the oxygen-reduced gas and a second outlet that communicates with the second chamber and is used to discharge the oxygen-enriched gas. The membrane body is provided with several juxtaposed channels that are divided into first channels and second channels, the channels arranged in the housing in such a way that a first end of each channel on one side of the membrane body is exposed to the first chamber, while a second end of each channel on the other side of the membrane body is exposed to the second chamber. In all first channels, the first end is constructed open, and the second end is constructed closed. In all second channels, the first end is constructed closed, and the second end is constructed open. The membrane body is constructed so that adjoining channels have common walls and the walls of the channels are formed by the oxygen transport membrane. The oxygen transport membrane is positioned so that an inside of the first channels is formed by the retention side of the oxygen transport membrane, and an inside of the second channels is formed by the permeation side of the oxygen transport membrane. The membrane body is held in a gas-tight manner on an outside between the ends of the channels by way of holding means at the housing.

In a second exemplary embodiment, the oxygen separation device has a housing comprising a first inlet, a second inlet, a first outlet, and a second outlet, a membrane body comprising an oxygen transport membrane and a plurality of juxtaposed channels and separating the housing into a first chamber and second chamber, the oxygen transport membrane having a retention side and a permeation side and designed to transport oxygen from the retention side to the permeation side, and the plurality of juxtaposed channels divided into first channels and second channels and arranged in the housing such that a first end of each channel on one side of the membrane body is exposed to the first chamber and a second end of each channel on another side of the membrane body is exposed to the second chamber, and means for holding the membrane body in a gas-tight manner at an outside between the ends of the channels by way of holding means. The retention side of the oxygen transport membrane communicates with the first chamber and the permeation side of the oxygen transport membrane communicates with the second chamber. The first inlet communicates with the first chamber and is used to introduce an oxygen-containing gas and the second inlet communicates with the second chamber and is used to introduce a gas to be enriched with oxygen. The oxygen transport membrane removes oxygen from the introduced oxygen-containing gas and feeds the oxygen into the introduced gas to be enriched with oxygen, so that in the first chamber an oxygen-reduced gas and in the second chamber an oxygen-enriched gas are formed. The first outlet communicates with the first chamber and is used to discharge the oxygen-reduced gas and the second outlet communicates with the second chamber and is used to discharge the oxygen-enriched gas. In all first channels, the first end is constructed open and the second end is constructed closed and in all second channels, the first end is constructed closed, and the second end is constructed open. The membrane body is constructed so that adjoining first and second channels have a common wall, the walls of the channels formed by the oxygen transport membrane. The oxygen transport membrane is positioned so that an inside of the first channels is formed by the retention side of the oxygen transport membrane, and an inside of the second channels is formed by the permeation side of the oxygen transport membrane.

BRIEF DESCRIPTION OF THE DRAWING

A preferred embodiment of the invention is disclosed in the following description and illustrated in the accompanying drawing, in which.

DETAILED DESCRIPTION OF THE INVENTION

Figure 1:
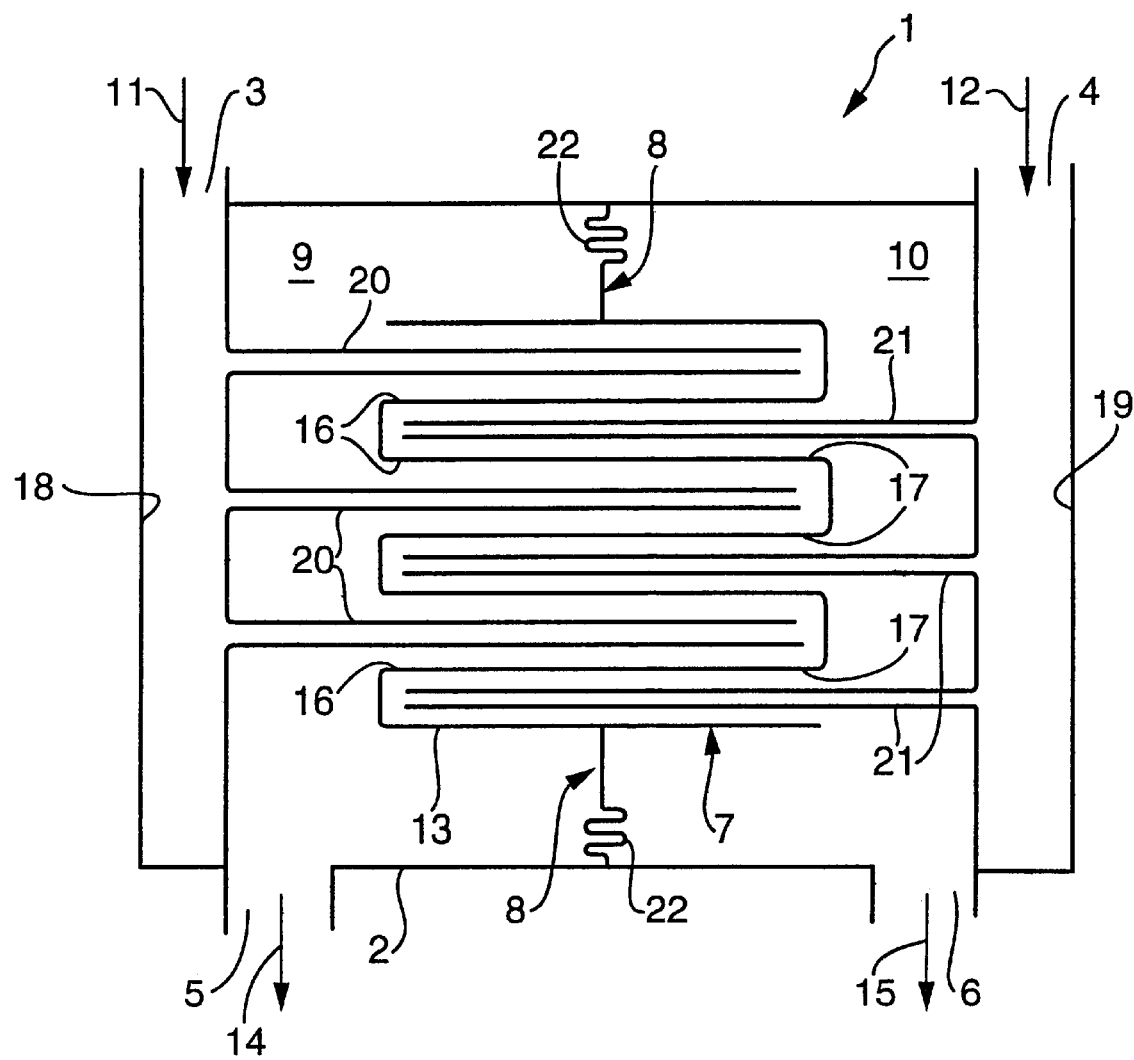
FIG. 1 shows a greatly simplified, schematic longitudinal section through an oxygen separation device according to the invention.

The invention is based on the general idea of forming the membrane body by way of an arrangement of first and second channels, each of which extends into the first chamber and respectively into the second chamber. The first channels are hereby closed at their ends projecting into the second chamber, while the second channels are closed at their ends projecting into the first chamber. The walls of the channels are formed by the oxygen transport membrane, which is hereby positioned so that the insides of the first channels communicating with the first chamber are formed by the retention side of the oxygen transport membrane, and the insides of the second channels communicating with the second chamber are formed by the permeation side of the oxygen transport membrane. This means that the oxygen is transported from the first channels into the second channels. The production of such a membrane body can be easily designed so that the adjoining channels lie in a gas-tight manner against each other. In particular, the channels hereby may have common walls that are formed by the oxygen transport membrane. The closure of the individual ends of the channels also can be realized in a relatively simple manner. Finally, the membrane body can be constructed with little expenditure in such a way between the ends of the channels that a sealed positioning of the membrane body on the housing by way of its outside can be realized in an especially simple manner.

In order to position the membrane body on the housing, suitable holding means are used, which preferably may comprise compensation means for compensating the thermal expansion effects. With these measures, it is possible to avoid tensions in the material of the membrane body in a particularly simple manner.

In a preferred embodiment, the housing may comprise a first gas manifold whose inlet is formed by the first inlet of the housing, and whose outlet is formed by several first feeder lines that originate from the first gas manifold and project into the first channels and end inside the first channels. Preferably, these feeder lines end near the closed ends of the first channels. These measures cause an intensive flow around and onto the insides of the first channels, i.e. the retention side of the oxygen transport membrane, by the oxygen-containing gas. This measure therefore supports the effectiveness of the oxygen transport membrane.

It is useful that the housing also comprises a second gas manifold whose inlet is formed by the second inlet of the housing, and whose outlet is formed by several second feeder lines that originate from the second gas manifold and project into the second channels and end inside the second channels. In this case also, a version is preferred in which the second feeder lines end near the closed ends of the second channels. The measures bring about an intensive flow of the gas to be enriched with oxygen onto the insides of the second channels, i.e. the permeation side of the oxygen transport membrane. This results in a flushing effect that increases the efficiency of the oxygen transport membrane.

A rectangular or square cross-section for the channels is preferred. This construction makes it possible that the membrane body is realized especially simply in a tight manner between the adjoining channels. This construction also permits an alternate arrangement of the first channels and second channels. If the adjoining channels also have common walls, a honeycomb structure is obtained for the membrane body. Such a construction has a sufficient strength even with relatively thin wall thicknesses. Since the performance of the oxygen transport membrane increases with a decreasing wall thickness, the performance of the separation device can be improved with the honeycomb structure.

According to FIG. 1, an oxygen separation device 1 comprises a housing 2 that has a first inlet 3, a second inlet 4, a first outlet 5 and a second outlet 6. Inside the housing 2, a membrane body 7 is attached to the housing 2 with holding means 8. This membrane body 7 is hereby arranged in the housing 2 so that it separates a first chamber 9 from a second chamber 10 in a gas-tight manner in the housing 2.

During the operation of the oxygen separation device 1, an oxygen-containing gas 11, for example ambient air, is fed to the first inlet 3. Since the first inlet 3 communicates with the first chamber 9, the oxygen-containing gas 11 is fed in this manner into the first chamber 9. An oxygen-enriched gas 12, for example recycled combustion waste gas, is fed to the second inlet 4, and is in this way fed into the second chamber 10, since the second inlet 4 communicates with the second chamber 10.

The membrane body 7 comprises an oxygen transport membrane 13 that is positioned so that it is exposed on one side to the first chamber 9 and, on the other side, to the second chamber 10 or communicates with the respectively facing chamber 9,10. During the operation of the oxygen separation device 1, the oxygen transport membrane 13 transports oxygen from the first chamber 9 into the second chamber 10. In this manner, a gas 14 with reduced oxygen content is formed from the oxygen-containing gas 11, which oxygen-reduced gas exits through the first outlet 5 communicating with the first chamber 9 from the housing 2. On the other side, an oxygen-enriched gas 15 is formed in the second chamber 10 from the gas 12 to be enriched with oxygen, said oxygen-enriched gas leaving the housing 2 through the second outlet 6 that communicates with the second chamber 10.

To achieve the mentioned flow through the housing 2, appropriate fan means can be positioned upstream or downstream from the oxygen separation device 1.

In the oxygen separation device 1 according to the invention, the membrane body 7 has several juxtaposed channels, i.e. several first channels 16 and several second channels 17. In the shown exemplary embodiment, three each first channels 16 and three each second channels 17 that alternately adjoin each other are shown as examples. The individual channels 16, 17 hereby principally may be provided transversely to their extension direction, i.e. transversely to the drawing plane, with any desired cross-section. However, channels with a rectangular, in particular square cross-section, are hereby preferred. The individual channels 16, 17 can extend vertically to the drawing plane, principally as far as desired, inside the housing 2. However, an embodiment is preferred, in which several first and second channels 16, 17 also adjoin each other vertically to the drawing plane, and which channels are hereby preferably alternately arranged.

According to FIG. 1, the channels 16, 17 are arranged in the housing 2 in such a way that their ends shown here on the left, i.e. the ends at the left side of the membrane body 7, are exposed to the first chamber 9, while their ends shown here on the right, i.e. the ends at the right side of the membrane body 7, are exposed to the second chamber 10. All channels 16 and 17 have an open end and a closed end. In all first channels 16, the left ends exposed to the first chamber 9 are hereby open, while the right ends exposed to the second chamber 10 are closed. In the second channels 17, this is exactly reversed, so that in the second channels 17 the left ends exposed to the first chamber 9 are constructed closed, while the right ends exposed to the second chamber 10 are constructed open.

The oxygen transport membrane 13 is arranged inside the membrane body 7 in such a way that it forms the common walls of the adjoining channels 16, 17. The oxygen transport membrane 13 is hereby positioned so that the insides of the first channels 16 that communicate with the first chamber 9 are in each case formed by the one side, the so-called "retention side" of the oxygen transport membrane 13, while the insides of the second channels 17 that communicate with the second chamber 10 are formed by the other side, the so-called "permeation side" of the oxygen transport membrane 13. Since the oxygen transport membrane 13 transports oxygen from its retention side to its permeation side, the membrane arrangement realized here feeds oxygen from the first channels 16 into the second channels 17.

The housing 2 has on the side shown here on the left a first gas manifold 18 and on the side shown on the right a second gas manifold 19. From the first gas manifold 18, several first feeder lines 20 branch off, each of which enters into a first channel 16, i.e. close to the closed end of the respective first channel 16. There, the first feeder lines 20 end inside the first channels 16. In a corresponding manner, several second feeder lines 21 also branch off the second gas manifold 19, which second feeder lines in each case project rather far into one of the second channels 17 and there end near the closed end of the inside of a respective second channel 17.

The inlet of the first gas manifold 18 is formed by the first inlet 3 of the housing 2, while the outlet of the first gas manifold 18 is formed by the first feeder lines 20, through which the first gas manifold 18 communicates through the first channels 16 with the first chamber 9. Analogously, the second inlet 4 of the housing 2 forms the inlet of the second gas manifold 19, whose outlet is formed by the second feeder lines 21, through which the first gas manifold 19 communicates via the second channels 17 with the second chamber 10.

As a result of the selected orientation of the channels 16, 17 in the housing 2, a construction can be realized for the membrane body 7 that has an outside with a particularly simple structure. On this outside of the membrane body 7, the holding means 8 then are able to engage with relatively little expenditure in such a way that in addition a tight connection of the holding means 8 on the membrane body 7 can be ensured. In the same way, an inside of the housing 2 facing the membrane body 7 can be designed in an especially simple manner in order to also enable in this place a simple engagement of the holding means 8 on the housing 2, so that a tight connection also can be realized on the housing side. The design of the membrane body 7 therefore simplifies a sealed positioning of the membrane body 7 in the housing 2. In order to compensate thermal expansion effects that can occur during the operation of the oxygen separation device 1, the holding means 8 also may be provided with appropriate, suitable compensation means 22 that permit, for example, relative movements between the membrane body 7 and the housing 2 and avoid tensions in the material of the membrane body 7.

The oxygen separation device 1 according to the invention functions as follows:

The oxygen-containing gas 11 entering the first gas manifold 18 via the first inlet 3 is fed by the first feeder lines 20 to deep inside the first channels 16. In this way, an intensive flow of the oxygen-containing gas 11 onto the retention side of the oxygen transport membrane 13 results. The oxygen transport membrane 13 removes oxygen from the oxygen-containing gas 11 on its retention side and transports this oxygen to the permeation side. Through the open ends of the first channels 16, now oxygen-reduced gas 14 enters into the first chamber 9 and exits it through the first outlet 5. The gas to be enriched with oxygen 12 enters the second gas manifold 19 through the second inlet 4 and is distributed from this manifold to the second feeder lines 21. These second feeder lines 21 feed the gas 12 to be enriched with oxygen deep into the second channels 17, achieving an intensive flow around and flushing of the permeation side of the oxygen transport membrane 13. The oxygen transported from the retention side to the permeation side is hereby absorbed by the gas that was fed in, so that the oxygen-enriched gas 15 then enters from the open ends of the second channels 17 into the second chamber 10. From the second chamber 10, the oxygen-enriched gas 15 exits the housing 2 through the second outlet 6.

As explained above, the oxygen separation device 1 according to the invention is characterized by a particularly small expenditure for achieving a sealed positioning of the membrane body 7 in the housing 2. The design of the membrane body 7 according to the invention also makes it possible to produce and maintain this device 1 in a relatively simple manner.

What is claimed is:

1. An oxygen separation device comprising:
   a membrane body; and
   a housing, in which the membrane body separates a first chamber from a second chamber,
   wherein the housing comprises a first inlet that communicates with the first chamber and is used to introduce an oxygen-containing gas and a second inlet that communicates with the second chamber and is used to introduce a gas to be enriched with oxygen, wherein the membrane body comprises an oxygen transport membrane that has a retention side and a permeation side and is designed so that it transports oxygen from the retention side to the permeation side, wherein the membrane body is arranged inside the housing in such a way that the retention side of the oxygen transport membrane communicates with the first chamber, and the permeation side of the oxygen transport membrane communicates with the second chamber, wherein the oxygen transport membrane removes oxygen from the introduced oxygen-containing gas and feeds this oxygen into the introduced gas to be enriched with oxygen, so that in the first chamber an oxygen-reduced gas and in the second chamber an oxygen-enriched gas are formed, wherein the housing comprises a first outlet that communicates with the first chamber and is used to discharge the oxygen-reduced gas and a second outlet that communicates with the second chamber and is used to discharge the oxygen-enriched gas, wherein the membrane body is provided with several juxtaposed channels that are divided into first channels and second channels, the channels arranged in the housing in such a way that a first end of each channel on one side of the membrane body is exposed to the first chamber, while a second end of each channel on the other side of the membrane body is exposed to the second chamber, wherein in all first channels, the first end is constructed open, and the second end is constructed closed, wherein in all second channels, the first end is constructed closed, and the second end is constructed open, wherein the membrane body is constructed so that adjoining channels have common walls, wherein walls of the channels are formed by the oxygen transport membrane, wherein the oxygen transport membrane is positioned so that an inside of the first channels is formed by the retention side of the oxygen transport membrane, and an inside of the second channels is formed by the permeation side of the oxygen transport membrane, and wherein the membrane body is held in a gas-tight manner on an outside between the ends of the channels by way of holding means at the housing.

2. The oxygen separation device according to claim 1, wherein the holding means comprises means for compensation that compensates for a thermal expansion effect.

3. The oxygen separation device according to claim 1, wherein the housing comprises a first gas manifold whose inlet is formed by the first inlet of the housing, and whose outlet is formed by several first feeder lines that originate from the first gas manifold and project into the first channels and end inside the first channels.

4. The oxygen separation device according to claim 3, wherein the first feeder lines project into the first channels close to their closed ends and end there.

5. The oxygen separation device according to claim 3, wherein each first channel is associated with a first feeder line.

6. The oxygen separation device according to claim 1, wherein the housing comprises a second gas manifold whose inlet is formed by the second inlet, and whose outlet is formed by several second feeder lines that originate from the second gas manifold and project into the second channels and end inside the second channels.

7. The oxygen separation device according to claim 6, wherein the second feeder lines project into the second channels close to their closed ends and end there.

8. The oxygen separation device according to claim 6, wherein each second channel is associated with a second feeder line.

9. The oxygen separation device according to claim 1, wherein the channels have an essentially rectangular or essentially square cross-section.

10. The oxygen separation device according to claim 1, wherein the membrane body has a honeycomb structure.

11. The oxygen separation device according to claim 1, wherein the membrane body is constructed in such a way that first channels and second channels alternate.

12. An oxygen separation device comprising:

a housing comprising a first inlet, a second inlet, a first outlet, and a second outlet;

a membrane body comprising an oxygen transport membrane and a plurality of juxtaposed channels and separating the housing into a first chamber and second chamber, the oxygen transport membrane having a retention side and a permeation side and designed to transport oxygen from the retention side to the permeation side, and the plurality of juxtaposed channels divided into first channels and second channels and arranged in the housing such that a first end of each channel on one side of the membrane body is exposed to the first chamber and a second end of each channel on another side of the membrane body is exposed to the second chamber; and means for holding the membrane body in a gas-tight manner at an outside between the ends of the channels by way of holding means, wherein the retention side of the oxygen transport membrane communicates with the first chamber and the permeation side of the oxygen transport membrane communicates with the second chamber, wherein the first inlet communicates with the first chamber and is used to introduce an oxygen-containing gas and the second inlet communicates with the second chamber and is used to introduce a gas to be enriched with oxygen, wherein the oxygen transport membrane removes oxygen from the introduced oxygen-containing gas and feeds the oxygen into the introduced gas to be enriched with oxygen, so that in the first chamber an oxygen-reduced gas and in the second chamber an oxygen-enriched gas are formed, wherein the first outlet communicates with the first chamber and is used to discharge the oxygen-reduced gas and the second outlet communicates with the second chamber and is used to discharge the oxygen-enriched gas, wherein in all first channels the first end is constructed open and the second end is constructed closed and in all second channels the first end is constructed closed, and the second end is constructed open, wherein the membrane body is constructed so that adjoining first and second channels have a common wall, wherein walls of the channels are formed by the oxygen transport membrane, and wherein the oxygen transport membrane is positioned so that an inside of the first channels is formed by the retention side of the oxygen transport membrane, and an inside of the second channels is formed by the permeation side of the oxygen transport membrane.

* * * * *